Aug. 6, 1935. H. PIEPER 2,010,273
BRAKE CONTROLLING DEVICE
Filed March 16, 1932 4 Sheets-Sheet 1

Patented Aug. 6, 1935

2,010,273

UNITED STATES PATENT OFFICE 2,010,273

BRAKE CONTROLLING DEVICE

Henri Pieper, Brussels, Belgium

Application March 16, 1932, Serial No. 599,303
In Belgium March 19, 1931

12 Claims. (Cl. 188—198)

Applications have been filed in Belgium March 19, 1931 and Germany May 13, 1931.

The invention relates to a brake device for vehicles and similar purposes and has for its object the correction of the variations of the distance between the brake shoes and the wheels. It has already been proposed to compensate the increase of this distance by means of a member following the movements of the piston under the influence of a friction action and being operative during the releasing of the brake shoes so as to arrest the movement of the piston. This compensation is obtained by changing the relative position of this member and of the piston towards the end of the braking stroke. Such brake controlling device which compensates only the increase of the distance between brake shoes and wheels is not operative where diminutions of the distance between brake shoes and wheels take place, and in particular cannot be employed on vehicles in which the distance between brake shoes and wheels varies with the degree of bending of the suspension springs, i. e. of the vehicle load.

The brake controlling device according to the invention compensates for a decrease as well as of an increase of the distance between brake shoes and wheels. This result is obtained by automatically varying in the case of a decrease of the distance between brake shoes and wheels the position of the member usually following the displacements of the piston with respect to this piston by the action of a device becoming operative at the moment of the brake shoes touching the wheels. In the case of an increase of the distance between brake shoes and wheels this compensation is effected by the action of a stationary abutment which stops the movement of the member following the piston when it has been displaced a certain distance corresponding to the stroke of the piston required for applying the brake shoes to the wheels and for braking.

The correction of the diminutions of the distance between brake shoes and wheels according to the invention is based on the fact that the driving action exercised by the brake piston upon the brake mechanism during the applying of the brake shoes to the wheels is relatively weak and corresponds to the passive resistances and the counter-force of the return springs and, after the applying of the brake shoes to the wheels, suddenly increases to an essentially higher value for producing the braking action.

The device becoming operative at the moment of the application of the brake shoes to the wheels may be constituted by a diaphragm working as a piston and being exposed on the one side to the pressure existing in the brake cylinder and on the other side to the action of a return spring, the tension of which is sufficiently high to prevent a displacement of the diaphragm during the applying of the brake shoes to the wheels. Instead of a diaphragm or of a similar means, an electromagnet or a solenoid may be employed, the circuit of which is controlled by means of the needle of a manometer which is displaced by the action of the pressure existing in the brake cylinder and closes the circuit when this pressure corresponds to the initial pressure of the braking. Furthermore, the device becoming operative at the moment of the application of the brake shoes to the wheels may be influenced also by an elastic means inserted in the brake mechanism and directly or indirectly acting upon this device by means of its deformations.

The arresting of the driving piston during the release of the brakes may be obtained by means of a mechanical action by providing between the piston and the member usually following this piston a friction force higher than the counter-force of the return spring of the piston and by arranging an abutment stopping, after a certain releasing stroke, the movement of the member usually following the piston. Instead of a mechanical action, a hydraulic action may be employed in which case there is inserted into the evacuation conduit of a liquid a valve which closes this conduit at the end of the releasing stroke. This valve may follow the displacements of the member usually following the movement of the piston or it may be electrically controlled by this member.

The accompanying drawings show schematically, by way of example, several embodiments of the brake controlling device according to the invention.

Figure 1:
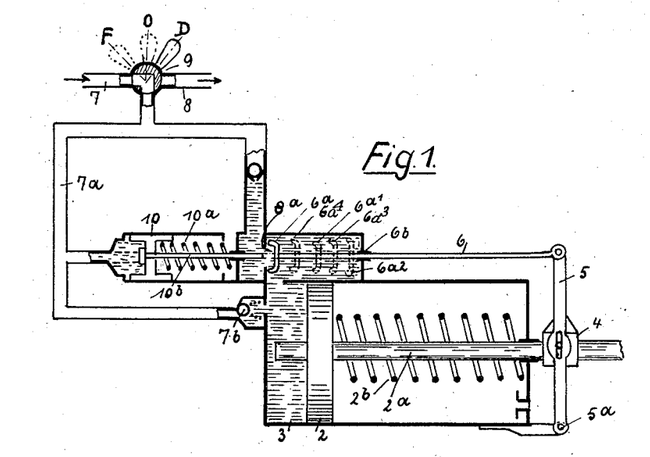
Figure 1 illustrates a form of the invention in which the blocking of the piston is effected by hydraulic means.
Figures 2, 3:
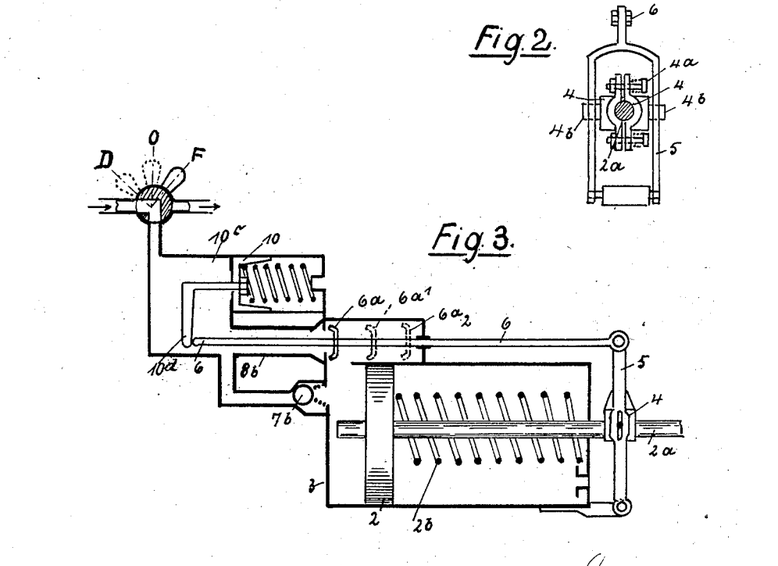
Figure 2 shows in detail the friction device of Figure 1.
Figure 3 represents a modified form of the brake controlling device in which a piston rapidly returning to its original position is used.

According to Figures 1 and 2, the piston 2, the rod 2a of which is connected to the brake mechanism, is adapted to move in a cylinder 3 against the action of a return spring 2b. A ring 4 composed of two parts is enabled to slide with a relatively high friction upon the piston rod 2a. The friction action results from springs enclosing the screws 4a connecting together the two ring halves. An adjusting lever 5 is articulated to the pivot 5a fixed solidly to the cylinder 3 and shows two slits conducting two pivots 4b fixed to the ring 4. The upper end of the bracket 5 is articulated to a rod 6 carrying a valve 6a. The driving side of the piston 2 can be alternatively put in communication with a charging or discharging reservoir through the conduits 7, 8 by adjusting the cock 9 accordingly.

When turning the cock 9 to the positions shown in Figure 1, the liquid coming from the charging reservoir through the conduits 7, 7a and past the return valve 7b enters the brake cylinder 3 and acts upon the piston 2. Assuming a normal distance between brake shoes and wheels, the valve 6a, which is carried away by the piston 2 through the medium of the member 6 following the movement of the piston 2 and of the friction-ring 4a, will occupy the position $6a^1$, immediately the brake shoes touch the wheels. During this stroke of the applying of the brake shoes to the wheels, the pressure existing in the cylinder 3 is relatively feeble and corresponds to the passive resistances and the counter-action of the return spring 2b. The action of this pressure, exercised upon the small piston 10 movable in a cylinder branched from the conduit 7a, is not sufficiently high for compressing the return spring 10a of this piston 10. At the moment where the brake shoes are applied to the wheels, the pressure suddenly increases in the cylinder 3 and in the conduit 7a to a very much higher value and consequently displaces the piston 10 against the action of the return spring 10a. At the end of its stroke, the small piston 10 acts, by means of its rod 10b upon the valve 6a to which the rod 10b is applied. During the braking action proper, the piston 2 continues to move towards the right hand and displaces the member 6 and the lever 5. At the end of the whole braking stroke of the piston 2, the valve 6a occupies the position $6a^2$ in which it abuts the stationary abutment 6b.

In the case of an increase of the distance between brake shoes and wheels, the valve 6a occupies the position $6a^3$ at the moment of the application of the brake shoes to the wheels and, therefore, attains the position $6a^2$ before the whole braking action is executed. During the remaining part of the braking stroke, the valve 6a cannot overstep the position 6b and, consequently, the piston rod 2a will be displaced in the ring 4 relatively to this ring. During the return of the piston 2 which results from turning the cock 9 from the position D into the position F, the valve 6a will be displaced simultaneously with the piston 2 and closes the opening 8a when the piston 2 has effected a stroke corresponding to the normal releasing stroke. This closure of the opening 8a interrupts the flow of liquid from the cylinder 3 to the discharge reservoir through the conduit 8.

In the case of a decrease of the distance between brake shoes and wheels, the valve 6a occupies for instance the position $6a^4$ at the moment of the application of the brake shoes to the wheels. The increase of pressure arising at this moment in the cylinder 3 and in the conduit 7 will provoke a displacement of the small piston 10 to the right hand against the action of the return spring 10a so that its rod 10b moves the valve 6a into the position $6a^1$. This displacement of the valve 6a is allowed for the reason that the ring 4 is capable of sliding upon the piston rod 2a.

During the braking action proper, the valve 6a moves from position $6a^1$ to position $6a^2$ without causing the ring 4 to slide upon the piston rod 2a. When releasing the brake shoes, the valve 6a arrests the flow of liquid towards the discharge reservoir after the piston 2 has effected the normal releasing stroke. This working of the brake controlling device shown in Figures 1 and 2 assures a distance of a constant value between the brake shoes and the wheels after the releasing of the brakes.

Figure 3 is distinguished from Figure 1 by the flow of liquid taking place during the releasing through a conduit 8b having a cross-section reduced in relation to the pressure area of the piston 10. This reduction of cross-section has the effect of diminishing the pressure more rapidly in the space 10c where it acts upon the small piston 10 than in the brake cylinder 3. Therefore by the piston 10 is caused to rapidly return to its original position and the member 6, movable with the piston 2, is prevented during the releasing of the brakes from being acted upon by the arm 10d fixed solidly to the piston 10 and corresponding to the rod 10b of Figure 1. According to Figure 3, compensation for too little slack as well as for too large slack takes place in the same manner as according to Figure 1.

Figure 4:
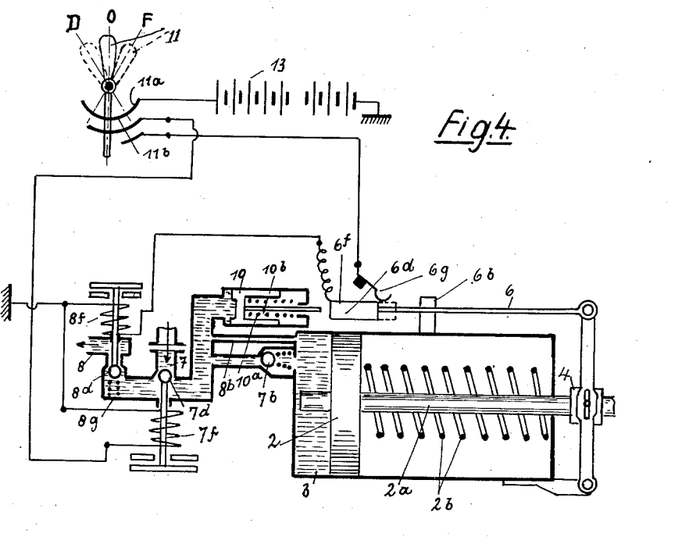
Figure 4 shows the electric control of a valve inserted into a conduit, serving for evacuating a liquid from the brake cylinder.

According to Figure 4 the flow of the liquid from the charging reservoir to the brake cylinder 3 is controlled by means of a valve 7d which is held closed by an electro-magnet 7f, the excitation of which is sufficiently high to overcome the action of the pressure of the charge reservoir tending to open the valve. The flow of liquid from the brake cylinder 3 towards the discharge reservoir passes through a valve 8d being under the action of a return spring 8g and controlled by an electro-magnet 8f. The brake cylinder 3 is connected with these valves on the one hand through a conduit controlled by a return valve 7b and on the other hand through the conduit 8b of reduced cross-section. The exciting circuit of the electro-magnet 8f contains a contact 6f integral with and movable with the member 6 and which is displaced by the piston 2 simultaneously with the member 6. This movable contact 6f and a stationary contact 6g cooperate in such a way that the circuit of the electro-magnet 8f is opened at the end of the releasing stroke. The small piston 10, which is adapted to move in its cylinder against the action of the return spring 10a, acts after a certain stroke by means of the rod 10b upon the block 8d carrying the movable contact 6f.

When the controller handle 11 is brought into the position F, the circuit of the electro-magnets 7f and 8f is interrupted, whereby the admission of liquid to the brake cylinder 3 is allowed through the valves 7d and 7b and the conduit 8b of the reduced cross-section. Consequently the piston 2 will be displaced and results in the application of the brake shoes upon the wheels. During this stroke of the piston 10, the pressure exercised upon this piston is not sufficiently high to displace the piston 10 against the action of the return spring 10a. When the normal distance exists between brake shoes and wheels, the block 6d will occupy the position indicated in dotted lines in Figure 4 at the moment when the brake shoes touch the wheels i. e. at the end of the first period of the whole braking operation during which period the brake piston brings the brake shoes into contact with the wheels without yet exerting a braking pressure on the wheels. In the case of a diminution of this distance between brake shoes and wheels, the block 6d has not attained at this moment this position and the small piston 10 which is displaced at this moment under the action of the increase of pressure in the brake cylinder will execute its whole stroke and push the block 6d into the position indicated in dotted lines. During this movement of the block 6d, the ring 4 slides upon the piston rod 2a.

During the braking stroke proper i. e. during the second period of the whole braking operation the block 6d is displaced to such an extent that it attains the abutment 6b at the moment of the completion of the braking stroke. On the other hand, where the distance between brake shoes and wheels has been increased, the block 6d oversteps the position indicated in dotted lines during the applying of the brake shoes upon the wheels so that it is arrested before the completion of the whole braking action by the abutment 6b, which causes the piston rod 2a to slide in the ring 4. Therefore, the block 6d always is brought into contact with the abutment 6b at the end of the whole braking stroke independently of the increase or decrease of the distance between brake shoes and wheels.

When the controller handle 11 is brought into the releasing position D, the battery 13 supplies current to the electro-magnet 8f through the controller contacts 11, 11b and the contacts 6g, 6f and also to the electro-magnet 7f. The electro-magnet 8f opens the valve 8d and the electromagnet 7f closes the inlet valve 7 and the liquid of the brake cylinder 3 can be evacuated from this cylinder through the conduit 8b by the return spring 2b acting upon the piston 2. Owing to the small cross-section of the conduit 8b, the pressure action upon the piston 10 falls more rapidly than the pressure action upon the driving piston 2, so that a rapid return of the small piston 10 into the original position takes place. When the block 6d has reached the position indicated in full lines, the circuit of the electro-magnet 8f is interrupted because the contact 6f leaves the contact 6g. The valve 8d is then closed by its spring 8g and arrests the piston 2. The distance between the stationary contact 6g and the abutment 6b is invariable and, therefore, the releasing stroke of the piston 2 cannot be varied and the distance between the brake shoes and the wheels is brought to the same permanently constant value, after each braking operation. This piston 2 can be held in any braking or releasing position by turning the controller handle 11 into the position 0 corresponding to the running of the vehicle and closing the two valves 8d and 7d.

Figure 5:
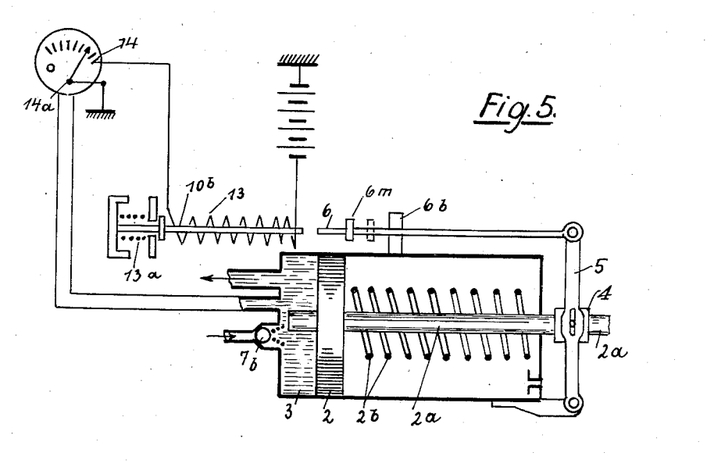
Figure 5 shows the electric control of the member usually following the piston.

Figure 5 is distinguished from Figures 1 to 4 in the small piston 10 being replaced by an electromagnet 13, the armature of which is under the action of a return spring 13a. The magnet 13, when energized, pulls the rod 10b integral with its armature to the right against the movable rod 6 carrying the block 6m. The exciting circuit of this electro-magnet is closed by the needle 14a of a manometer 14 at the moment of the application of the brake shoes to the wheels. In the case of an increase of the distance between brake shoes and wheels, the abutment 6m of the member 6, movable with the piston 2, results in the displacement of the friction ring 4 upon the piston rod 2a by touching the stationary abutment 6b. In the case of a decrease of the distance between brake shoes and wheels in which case, the piston 10 2, when applying the brake shoes to the wheels brings the movable abutment 6m into a position lying at a certain distance before the position indicated in dotted lines and corresponding to the position which this abutment 6m occupies in the case of a normal distance between brake shoes and wheels at the moment of the applying of the brake shoes to the wheels, the excited electro-magnet 13 advances at the moment of contact of the brake shoes with the wheels the movable abutment 6m into the dotted line position by means of the rod 10b acting upon the member 6 carrying the abutment 6m, and during advance of the abutment 6m, the ring 4 slides upon the piston rod 2a.

The arresting of the driving piston at the end of the releasing stroke is effected on the one hand by the movable member 6 touching the rod 10b having a limited stroke and on the other hand by choosing the friction force between the ring 4 and the piston rod 2 higher than the force of the return spring 2b.

Figure 6:
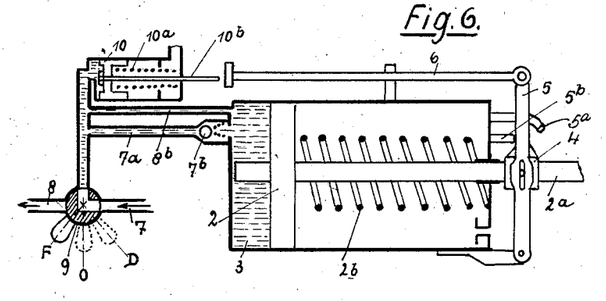
Figure 6 illustrates a form of the invention in which the blocking of the piston is effected by mechanical means during the releasing stroke.

In Figure 6, the friction force between the ring 4 and the piston rod 2a is chosen a little higher than the tension force of the return spring 2b of the piston 2. When the cock 9 is brought into the braking position F, the liquid flows from the charge reservoir through the conduits 7, 7a, the return valve 7b and the parallel conduit 8b of reduced cross-section into the cylinder 3 of the piston 2 and produces the displacement of this piston. As soon as the brake shoes have been applied upon the wheels, the small piston 10 will bring the member 6 in the case of a decrease of the play into the position which it must occupy at this moment in the case of normal play.

At the end of the braking stroke the lever 5 is applied to an abutment 5a fixed solidly to the cylinder 3, and which corresponds to the abutment 6b of the Figures 1 to 5. Further brake application, after the lever 5 engages the abutment 5a, causes the rod 2a to slide relative to the ring 4 and thereby compensate for too large a slack. When the cock 9 is turned into the releasing position D, the liquid flows from the cylinder 3 through the conduit 8b, the cock 9 and the pipe 8 towards the discharge reservoir. The small cross-section of the conduit 8b allows the rapid return of the small piston 10 into the original position under the action of the spring 10a.

When the piston 2 has effected the normal releasing stroke, corresponding to the return of the brake shoes and brake levers into the initial position, the lever 5 contacts an abutment 5b fixed to the cylinder 3. Owing to the relatively high friction existing between the ring 4 and the rod 2a, the movement of the piston 2 is stopped at this moment. The releasing stroke of the piston 2 is always limited to a value corresponding to the distance between the abutments 5a and 5b.

Figure 7:
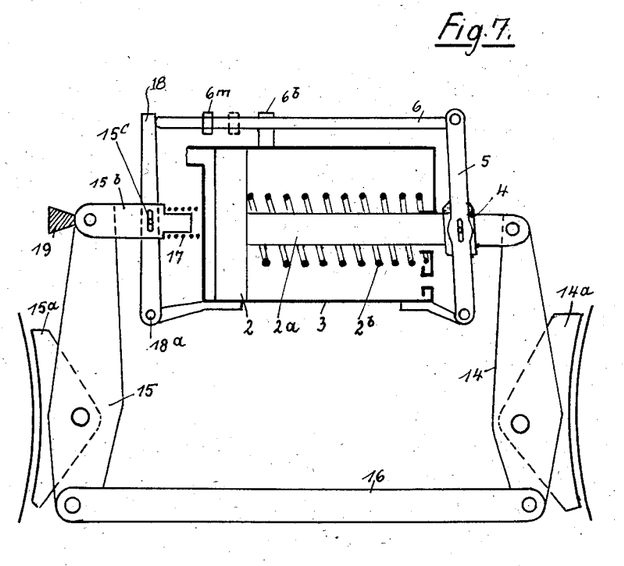
Figure 7 shows the employment of an elastic means inserted into the brake mechanism for obtaining the displacement of the member following the piston.

Figure 7 shows the employment of the invention in the case of a compensated gear comprising two levers 14 and 15 carrying the brake shoes 14a, 15a and connected together by means of an articulation rod 16. The brake piston 2 acts upon the lever 14 and the reaction of the brake lever system is received by the bottom of the brake cylinder 3 or other part fixed solidly to the vehicle frame with the aid of a spring 17 or other elastic means. The spring 17 is dimensioned so that it is compressed only when a reaction is exercised by the brake shoes applied to the wheels upon the brake lever system. A rod 15b articulated to the upper end of the lever 15 and acting upon the spring 17 is connected to a lever 18 which is articulated to the pivot 18a fixed solidly to the cylinder 3 and engages the rod 15b by means of a bolt 15c passing through a slit of the rod 15b. The lever 18 serves to enable the brake lever system to act upon the member 6 movable with the piston 2. The member 6 carries the abutment 6m which occupies the position indicated in dotted lines at the moment of the application of the brake shoes to the wheels when a normal distance between brake shoes and wheels exists.

When the piston 2 is displaced to the right hand during the braking operation by the liquid under pressure entering the brake cylinder, it displaces at the same time the movable member 6. As soon as the brake shoes 14a, 15a have been applied to the wheels, the driving force considerably increases and the lever 15 is turned relatively to the appertaining brake shoe 15a serving as a stationary point of rotation so that the end of the rod 15b compresses the spring 17 and is applied to the bottom of the cylinder 3. This displacement of the rod 15b effects at the same time a corresponding rotation of the lever 18. The possible compression of the spring 17 is chosen so that in the case of a decrease of the distance between brake shoes and wheels, the movable member or rod 6 is displaced by the lever 18 to such extent that the abutment 6m attains the position indicated in dotted lines. This displacement, allowed by the friction ring 4 sliding upon the piston rod 2a, causes a variation of the relative position of the rod 6 and the piston 2.

During the braking stroke proper, the displacement of the abutment 6m from the position indicated in dotted lines to the abutment 6b corresponds, except upon the increase of the distance between brake shoes and wheels to the way traversed during this time by the piston. This abutment 6m is always applied to the abutment 6b at the end of the braking stroke, independently of the variations eventually arising from the distance between brake shoes and wheels. When releasing the brake shoes, the arresting of the piston 2 is determined after a certain constant stroke by stopping the movable member contacting the upper end of the lever 18 which is blocked by a stationary abutment 19 limiting the rotation of the lever 15 in the one direction.

The frictional action between the ring 4 and the piston rod 2a is greater than the tension force of the return spring 2b of the driving piston also as in Figure 7.

Figure 8:
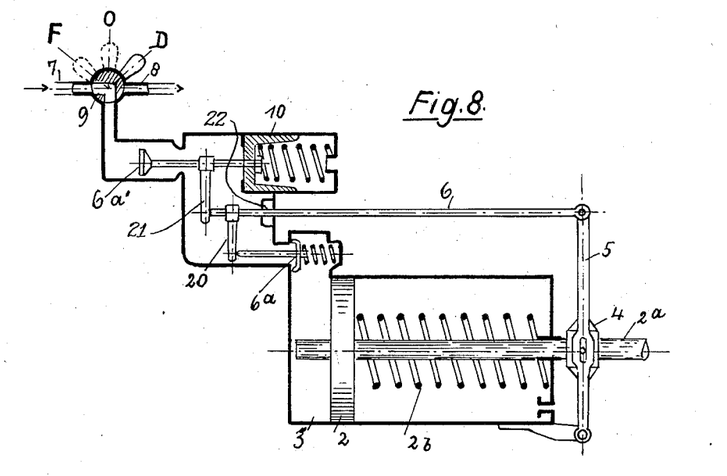
Figures 8 and 9 represent another modified form of the brake controlling device according to the invention in the releasing and in the braking position, respectively.
Figure 9:
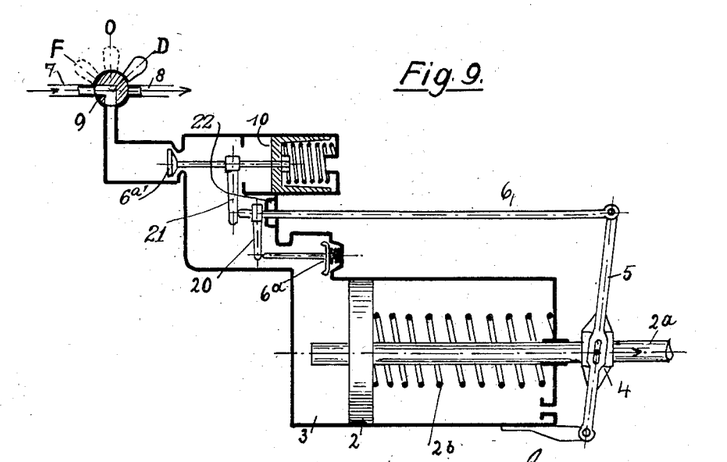

The brake controlling device shown in Figures 8 and 9 has for its object to realize a high operating speed of the brake during the application of the brake shoes to the wheels, i. e. during the first period of the whole braking operation and then to throttle the admission of liquid to the brake cylinder during the braking stroke proper, i. e. during the second braking period in order to render the brake perfectly and moderately regulable. To this end, the small piston 10 which is displaced at the moment of the brake shoes being applied to the wheels partially closes the opening, admitting the liquid, for instance oil, to the brake cylinder 3. On the other hand this small piston 10 returns to its initial position only at the moment when the brake shoes leave the wheels. Consequently, the brake is perfectly and moderately regulable as regards the braking as well as the releasing action and at the same time it operates at high speed during the first braking period comprising the application of the brake shoes to the wheels.

Figure 8 shows the brake occupying its release position and Figure 9 illustrates the same brake in its braking position. The valve 6a works as an automatic valve during the braking stroke of the piston 2 and the finger 20 fixed solidly to the movable member 6 connected by friction with the piston 2, follows the valve 6a so that on returning, it allows the valve 6a to return to its seat and thereby to stop the releasing stroke. The valve 6a' is fixed solidly to the small piston 10 and opens, when the brake has been released, the conduit of liquid to a large extent so that the speed with which the brake shoes are applied to the wheels is high. During this application of the brake shoes to the wheels, the small piston 10 brings the valve to its seat so as to throttle the flow of liquid and thereby, to retard the speed of the braking action and to render it moderate. Compensation for too little slack is effected by the small piston 10, by means of the finger 21 fixedly solidly to the rod of this piston carrying the valve 6a'. At the moment of contact of the brake shoes with the wheels, the movable member 6 which, when too little slack occurs, has not yet attained at this instant the position which it should occupy in the case of normal play, is advanced into this normal position by the finger 21 following the small piston 10. During this advance of the movable member 6, the ring 4 slides upon the piston rod 2a. Compensation for too large a slack is obtained by the abutment 22 corresponding to the abutment 6b of Figures 1 to 5. When an increase of the slack occurs, the finger 20 fixed solidly to the movable member 6 reaches the abutment 22 and thereby arrests the member 6, before the piston 2 has executed its whole braking stroke so that during the rest of this stroke, there is an advance of the piston 2 relative to the member 6, whereby the increase of slack is compensated. During this advance of the piston 2 the ring 4 slides upon the piston rod 2a.

It should be understood that the invention is not confined to the embodiments shown herein by way of exemplification and illustration, but it may be modified within the scope of the appended claims.

I claim:

1. A vehicle brake adjusting device of the character described serving for automatically compensating the variations of the normal play between the brake shoes and the wheels and comprising in combination a brake piston, a rod on said brake piston, a movable member capable of stopping the brake piston after the execution of a certain releasing stroke, means adapted for coupling said movable member to the brake piston rod in such a way that said movable member usually follows the displacements of the brake piston but is also enabled to vary its position relatively to the brake piston when a variation occurs in the normal play between brake shoes and wheels and means becoming operative in the case of a decrease of this play at the moment of the applying of the brake shoes to the wheels and then varying the relative position of said movable stopping member with respect to the brake piston so as to compensate said decrease of play.

2. A vehicle brake adjusting device of the character described serving for automatically compensating the variations of the normal play between the brake shoes and the wheels and comprising in combination a brake piston, a rod on said brake piston, a movable member capable of stopping the brake piston after the execution of a certain releasing stroke, means adapted for coupling said movable member to the brake piston rod in such a way that said movable member usually follows the displacements of the brake piston but is also enabled to vary its position relatively to the brake piston when a variation occurs in the normal play between brake shoes and wheels and means becoming operative in the case of a decrease of this play at the moment of the applying the relative position of said movable stopping member with respect to the brake piston so as to compensate said decrease of play, and means entering in action in the case of an increase of the normal play between brake shoes and wheels at the end of the whole normal braking stroke and then varying the relative position of said movable stopping member with respect to the brake piston so as to compensate said increase of play.

3. A vehicle brake adjusting device of the character described serving for automatically compensating the variations of the normal play between the braking shoes and the wheels and comprising in combination a brake piston, a rod on said brake piston, a movable member capable of stopping the brake piston after execution of a certain releasing stroke, means adapted for coupling said movable member to the brake piston rod in such a way that this member usually follows the displacements of the brake piston but is also enabled to vary its position relatively to the brake piston when a variation occurs in the normal play between brake shoes and wheels, an auxiliary piston being submitted to the action of the pressure of the brake cylinder, a spring acting upon said auxiliary piston in opposition to said pressure and preventing a displacement of said auxiliary piston until the brake shoes have been applied to the wheels, and means adapted for transmitting the movement of said auxiliary piston to said movable member in the case of a decrease of the normal play between brake shoes and wheels so as to produce a relative displacement of said movable member with respect to the brake piston and thereby to compensate said decrease of play.

4. A vehicle brake adjusting device of the character described permitting to automatically compensate the variations of the normal play between the brake shoes and the wheels and comprising in combination a brake piston, a rod on said brake piston, a movable member capable of arresting the brake piston after execution of a certain releasing stroke, means adapted for coupling by friction said movable member to the brake piston rod in such a way that this member usually follows the displacements of brake piston but is also enabled to vary its position relatively to the brake piston when a variation occurs in the normal play between brake shoes and wheels, an auxiliary piston being submitted to the action of the pressure in the brake cylinder, a spring acting in opposition to said pressure upon said auxiliary piston and preventing its displacements during the applying of the brake shoes to the wheels, means for transmitting the movement of said auxiliary piston to said movable member in the case of a decrease of the normal play between brake shoes and wheels so as to vary the relative position of said movable member with respect to the brake piston and thereby to compensate said decrease of play, an abutment arresting said movable member at the end of the whole normal braking stroke of the brake piston and thereby producing in the case of an increase of the normal play of the brake shoes a displacement of said movable member relatively to the brake piston to an extent compensating said increase of play.

5. A vehicle brake adjusting device of the character described serving for automatically compensating the variations of the normal play between the brake shoes and the wheels and comprising in combination a brake piston, a rod on said brake piston, a movable member capable of being displaced by the brake piston, means adapted for coupling said member to the brake piston rod in such a way that said movable member usually follows the displacements of the brake piston but is also enabled to vary during the braking stroke its position relatively to the brake piston when a variation occurs in the normal play between brake shoes and wheels, an abutment arresting said movable member and thereby the brake piston after execution of a certain releasing stroke, a brake gear serving for transmitting the action of the brake piston to the brake shoes, elastic means inserted in the brake gear so as to be deformed by the action of the pressure existing in the brake cylinder at the moment of the brake shoes being applied to the wheels, and means for transforming the deformation of said elastic means into a displacement of said movable member in the case of a decrease of the normal play between brake shoes and wheels so as to compensate thereby this decrease of play.

6. A vehicle brake adjusting device of the character described serving for automatically compensating the variations of the normal play between the brake shoes and the wheels and comprising in combination a brake piston, a rod on said brake piston, a movable member capable of being displaced by the brake piston, means adapted for coupling said member to the brake piston rod in such a way that said movable member usually follows the displacements of the brake piston but is also enabled to vary during the braking stroke its position relatively to the brake piston when a variation occurs in the normal play between brake shoes and wheels, an abutment arresting said movable member and thereby the brake piston after execution of a certain releasing stroke, a brake gear serving for transmitting the action of the brake piston to the brake shoes, elastic means inserted in the brake gear so as to be deformed by the action of the pressure existing in the brake cylinder at the moment of the brake shoes being applied to the wheels, and means for transforming the deformation of said elastic means into a displacement of said movable member in the case of a decrease of the normal play between brake shoes and wheels so as to compensate thereby this decrease of play, and a further abutment stopping said movable member at the end of the whole normal braking stroke of the brake piston in the case of an increase of the normal play between brake shoes and wheels so as to compensate this increase of play.

7. A vehicle brake adjusting device of the character described permitting to automatically compensate the variations of the normal play between the brake shoes and the wheels and comprising in combination a brake piston, a rod on said brake piston, a movable member being enabled to be displaced by the brake piston, means adapted for coupling said movable member to the brake piston rod in such a way that said member usually follows the displacements of the brake piston but is also enabled to vary during the braking stroke its position relatively to the brake piston when a variation occurs in the normal play between brake shoes and wheels, an abutment arresting said movable member after the execution of the whole normal braking stroke of the brake piston so as to produce in the case of an increase of said play of the brake shoes a relative displacement of said movable member with respect to the brake piston and thereby to compensate said increase of play, an auxiliary piston being submitted to the action of the pressure in the brake cylinder, a spring acting in opposition to said pressure upon said auxiliary piston and preventing its displacement until the brake shoes are applied to the wheels, means for transmitting the displacement of said auxiliary piston to said movable member in the case of a decrease of the normal play of the brake shoes so as to compensate said decrease of play, an electric circuit, an interrupter inserted in said circuit and being opened by said movable member after a certain releasing stroke of the brake piston, an electromagnet inserted in said electric circuit and causing, when deenergized, the stopping of the brake piston at the end of said releasing stroke.

8. A vehicle brake adjusting device of the character described serving for automatically compensating the variations of the normal play between the brake shoes and the wheels and comprising in combination a brake piston, a rod on said brake piston, a movable member being enabled to be displaced by the brake piston, means adapted for coupling by friction said movable member to the brake piston rod in such a way that said member usually follows the displacements of the brake piston but is also enabled to vary during the braking stroke its position relatively to the brake piston when a variation occurs in the normal play between brake shoes and wheels, an abutment arresting said movable member after execution of the whole normal braking stroke of the brake piston so as to provoke in the case of an increase of the play of the brake shoes a relative displacement of said movable member with respect to the brake piston and thereby to compensate said increase of play, an electric circuit, an interrupter inserted in said electric circuit, means permitting automatic closing of said interrupter by the action of the pressure arising in the brake cylinder at the moment the brake shoes are applied to the wheels, an electro-magnet inserted in said electric circuit and causing, when energized, said movable member to execute in the case of a decrease of the normal play of the brake shoes a relative displacement with respect to the brake piston to an extent compensating said decrease of play.

9. A vehicle brake adjusting device of the character described allowing the automatic compensation of the variations of the normal play between the brake shoes and the wheels and comprising in combination a brake piston, a rod on said brake piston, a movable member capable of being displaced by the brake piston, means adapted for coupling said member to the brake piston rod in such a way that said movable member usually follows the displacements of the brake piston but is also enabled to vary during the braking stroke its position relatively to the brake piston when a variation occurs in the normal play between brake shoes and wheels, an abutment arresting said movable member and thereby the brake piston after execution of a certain releasing stroke, an auxiliary piston being submitted to the action of the pressure of the brake cylinder, a spring acting upon said auxiliary piston in opposition to said pressure and preventing a displacement of said auxiliary piston until the brake shoes have been applied to the wheels, means adapted for transmitting the movement of said auxiliary piston to said movable member in the case of a decrease of the normal play between brake shoes and wheels so as to produce a relative displacement of said movable member with respect to the brake piston and thereby, to compensate said decrease of play, means adapted for arresting said movable member at the end of the whole normal braking stroke of the brake piston and, thereby, producing in the case of an increase of the normal play of the brake shoes a displacement of said movable member relatively to the brake piston to an extent compensating said increase of play, and a pipe system adapted for conducting the driving fluid to and from the cylinders of the brake piston and of the auxiliary piston and including a channel having a smaller cross-section than that of the other channels of the pipe system and serving for conducting the fluid away from the brake cylinder.

10. A vehicle brake adjusting device of the character described permitting to automatically compensate the variations of the normal play between the brake shoes and the wheels and comprising in combination a brake piston, a rod on said brake piston, a movable member capable of being displaced by the brake piston, means adapted for coupling said member to the brake piston rod in such a way that it usually follows the displacements of the brake piston but is also enabled to vary during the braking stroke its relative position with respect to the brake piston when a variation occurs in the normal play between brake shoes and wheels, a pipe serving for evacuating the fluid from the brake cylinder during the releasing stroke, a valve inserted in said pipe, means for transmitting the displacement of said movable member to said valve so as to close the same after a certain releasing stroke of the brake piston and thereby to stop this piston, an auxiliary piston being submitted to the action of the pressure of the brake cylinder, a spring acting upon said auxiliary piston in opposition to said pressure and preventing a displacement of said auxiliary piston until the brake shoes have been applied to the wheels, means for transmitting the movement of said auxiliary piston to said movable member in the case of a decrease of the normal play of the brake shoes so as to produce a relative displacement of said movable member with respect to the brake piston and, thereby, to compensate said decrease of play, and means adapted for arresting said movable member at the end of the whole normal braking stroke of the brake piston and, thereby, producing in the case of an increase of the normal play of the brake shoes a displacement of said movable member relatively to the brake piston to an extent compensating said increase of play.

11. A vehicle brake adjusting device of the character described serving for automatically compensating the variations of the normal play between the brake shoes and the wheels and comprising in combination a brake piston, a rod on said brake piston, a movable member capable of stopping the brake piston after execution of a certain releasing stroke, means adapted for coupling said movable member to the brake piston rod in such a way that said movable member usually follows the displacements of the brake piston but is also enabled to vary its position relatively to the brake piston when a variation occurs in the normal play between brake shoes and wheels, means becoming operative in the case of a decrease of this play at the moment of the brakes being applied to the wheels and then varying the relative position of said movable member with respect to the brake piston so as to compensate said decrease of play, and means adapted for opening the fluid admission to the brake cylinder to a large extent during the applying of the brake shoes to the wheels and to a small extent during the braking proper.

12. A vehicle brake adjusting device comprising in combination a brake cylinder, a piston movable in said cylinder, a second cylinder, an auxiliary piston in said second cylinder, a pipe adapted for conducting the driving fluid to said two cylinders, a valve inserted into said pipe, a spring acting upon said auxiliary piston in opposition to the fluid pressure of the brake cylinder acting also upon said auxiliary piston so as to allow a displacement of said auxiliary piston only after the applying of the brake shoes to the wheels, means for transmitting the movement of said auxiliary piston to said valve so as to partially close it during the braking proper.

HENRI PIEPER.